(12) United States Patent
Krishnaswamy (10) Patent No.: US 7,801,932 B2
(45) Date of Patent: Sep. 21, 2010

(54) UNDO HINTS TO SPEED UP SEGMENT EXTENSION AND TUNING OF UNDO RETENTION

(75) Inventor: Vasudha Krishnaswamy, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 283 days.

(21) Appl. No.: 11/249,149

(22) Filed: Oct. 11, 2005

(65) Prior Publication Data

US 2007/0083488 A1   Apr. 12, 2007

(51) Int. Cl.
*G06F 7/00* (2006.01)
*G06F 17/00* (2006.01)

(52) U.S. Cl. ............... 707/999.001; 707/609; 707/661; 707/662; 707/663; 707/678; 707/684

(58) Field of Classification Search ......... 707/2, 707/9, 10, 203; 705/2; 711/147; 712/300
See application file for complete search history.

(56) References Cited

U.S. PATENT DOCUMENTS

| | | | | |
|---|---|---|---|---|
| 4,674,039 | A * | 6/1987 | Chouery ............... | 712/300 |
| 5,129,070 | A * | 7/1992 | Dorotte ............... | 711/209 |
| 5,761,672 | A * | 6/1998 | Samuelsson et al. ........ | 707/10 |
| 5,890,000 | A * | 3/1999 | Aizikowitz et al. ....... | 717/154 |
| 5,907,848 | A | 5/1999 | Zaiken et al. | |
| 6,185,577 | B1 | 2/2001 | Nainani et al. | |
| 6,192,377 | B1 * | 2/2001 | Ganesh et al. ......... | 707/203 |
| 6,272,612 | B1 * | 8/2001 | Bordaz et al. ........ | 711/203 |
| 6,574,717 | B1 * | 6/2003 | Ngai et al. .......... | 711/147 |
| 6,587,847 | B1 | 7/2003 | Stier et al. | |
| 6,591,298 | B1 * | 7/2003 | Spicer et al. ........ | 709/224 |
| 6,631,374 | B1 * | 10/2003 | Klein et al. .......... | 707/8 |
| 6,694,340 | B1 | 2/2004 | Lyle et al. | |
| 6,976,022 | B2 | 12/2005 | Vemuri et al. | |
| 6,981,004 | B2 | 12/2005 | Ganesh et al. | |
| 7,035,990 | B1 * | 4/2006 | Muhlbauer .......... | 711/172 |
| 7,047,386 | B1 | 5/2006 | Ngai et al. | |
| 7,110,998 | B1 | 9/2006 | Bhandari et al. | |
| 7,127,456 | B1 | 10/2006 | Brown et al. | |

(Continued)

OTHER PUBLICATIONS

Burke, M. "An Interval-Based Approach to Exhaustive and Incremental Interprocedural Data-Flow Analysis" ACM Transactions on Programming Languages and Systems, Jul. 1990, vol. 12, No. 3, pp. 341-395.

(Continued)

*Primary Examiner*—Yicun Wu
*Assistant Examiner*—Yu Zhao
(74) *Attorney, Agent, or Firm*—Vista IP Law Group, LLP.

(57) ABSTRACT

Methods and systems for using undo hints to speed up segment extension are disclosed. While a process is searching other segments to find available space, the process collects undo hints that describe when space in a segment might become available. These undo hints are placed in a table of undo hints. When a process is not able to find available space, it may consult the table of undo hints to determine how much to decrease the undo retention. After the undo retention is decreased, the process may again consult the table of undo hints to find a segment that likely contains available space now that the undo retention time has been reduced.

26 Claims, 5 Drawing Sheets

U.S. PATENT DOCUMENTS

| | | | |
|---|---|---|---|
| 7,305,422 | B1 | 12/2007 | Wang |
| 2002/0091694 | A1* | 7/2002 | Hrle et al. .................... 707/9 |
| 2004/0054643 | A1 | 3/2004 | Vemuri et al. |
| 2004/0054644 | A1 | 3/2004 | Ganesh et al. |
| 2005/0015563 | A1 | 1/2005 | Yang et al. |
| 2005/0114409 | A1 | 5/2005 | Sinha et al. |
| 2005/0120062 | A1 | 6/2005 | Sinha et al. |
| 2005/0120064 | A1 | 6/2005 | Sinha et al. |
| 2005/0125430 | A1 | 6/2005 | Souder et al. |
| 2005/0131966 | A1* | 6/2005 | Lou .......................... 707/204 |
| 2005/0182658 | A1* | 8/2005 | Abraham-Fuchs et al. ..... 705/2 |
| 2005/0240633 | A1 | 10/2005 | Krishnaswamy et al. |
| 2005/0256829 | A1 | 11/2005 | Yang et al. |
| 2005/0256849 | A1 | 11/2005 | Krishnaswamy et al. |
| 2007/0083488 | A1 | 4/2007 | Krishnaswamy |
| 2007/0083566 | A1 | 4/2007 | Krishnaswamy et al. |

OTHER PUBLICATIONS

Chin, R.S. et al. "Distributed Object-Based Programming Systems" ACM Computing Surveys, Mar. 1991, vol. 23, No. 1, pp. 91-124.

Chiueh, T. et al. "Zodiac: A History-Based Interactive Video Authoring System" Proceedings of the 6th ACM International Conference on Multimedia (Multimedia '98), Bristol, UK, Sep. 1998, pp. 435-443.

Hudson, S.E. et al. "Object-Oriented Database Support for Software Environments" Proceedings of the 1987 ACM SIGMOD International Conference on Management of Data (SIGMOD '87), San Francisco, CA, May 27-29, 1987, vol. 16, No. 3, pp. 491-503.

Kunz, T. et al. "Fast Detection of Communication Patterns in Distributed Executions" Proceedings of the 1997 Conference of the Centre for Advanced Studies on Collaborative Research, Nov. 1997, pp. 1-13.

Leehane, T. "Level II Technical Support in a Distributed Computing Environment" Proceedings of the 24th Annual ACM SIGUCCS Conference on User Services, Sep. 1996, pp. 95-99.

Lomet, D.B. "MLR: A Recovery Method for Multi-level Systems" Proceedings of the 1992 ACM SIGMOD International Conference on Management of Data (SIGMOD '92), San Diego, CA, Jun. 2-5, 1992, vol. 21, No. 2, pp. 185-194.

Randell, B. et al. "Reliability Issues in Computing System Design" ACM Computing Surveys, Jun. 1978, vol. 10, No. 2, pp. 123-165.

Santry, D.S. et al. "Deciding when to forget in the Elephant file system" Proceedings of the 17th ACM Symposium on Operating Systems Principles (SOSP '99), Kiawah Island, SC, Dec. 1999, vol. 33, No. 5, pp. 110-123.

Soares, P.G. "On Remote Procedure Call" Proceedings of the 1992 Conference of the Centre for Advanced Studies on Collaborative Research, Nov. 1992, vol. 2, pp. 215-267.

Thatte, S.M. "Persistent Memory: A Storage Architecture for Object-Oriented Database Systems" Proceedings on the 1986 International Workshop on Object-Oriented Database Systems, Sep. 1986, pp. 148-159.

Office Action dated Nov. 2, 2006 for U.S. Appl. No. 10/846,099.
Office Action dated Jul. 16, 2007 for U.S. Appl. No. 10/846,099.
Office Action dated Mar. 25, 2008 for U.S. Appl. No. 10/846,099.
Office Action dated Oct. 1, 2008 for U.S. Appl. No. 10/846,099.
Office Action dated Oct. 31, 2006 for U.S. Appl. No. 10/846,095.
Office Action dated May 16, 2008 for U.S. Appl. No. 10/846,095.
Office Action dated Dec. 23, 2008 for U.S. Appl. No. 10/846,095.
Office Action dated Sep. 7, 2007 for U.S. Appl. No. 11/249,150.
Office Action dated Dec. 17, 2007 for U.S. Appl. No. 11/249,150.
Office Action dated Jul. 22, 2008 for U.S. Appl. No. 11/249,150.
Office Action dated Feb. 10, 2009 for U.S. Appl. No. 11/249,150.
Final Office Action dated Dec. 4, 2009 for U.S. Appl. No. 10/846,095.
Non Final Office Action dated Jun. 8, 2009 for U.S. Appl. No. 10/846,095.
Non Final Office Action dated Jul. 28, 2009 for U.S. Appl. No. 11/249,150.
Final Office Action dated Feb. 18, 2010 for U.S. Appl. No. 11/249,150.

* cited by examiner

| | Local Table of Undo Hints 214 | | | | | | | | |
|---|---|---|---|---|---|---|---|---|---|
| 90% | O | O | O | O | O | O | O | O | O | O |
| 80% | O | O | O | O | O | O | O | O | O | O |
| 70% | O | O | O | O | O | O | O | O | O | O |
| 60% | 101 06:02 | 349 06:59 | 268 06:28 | 010 06:01 | 923 06:40 | 772 06:17 | O | O | O | O |
| 50% | 213 07:08 | 230 07:15 | 649 07:48 | 236 07:12 | 367 07:39 | 708 07:28 | 091 07:20 | O | O | O |
| 40% | 765 08:08 | 766 08:10 | 767 08:12 | 302 08:46 | 487 08:32 | 488 08:34 | 909 08:12 | 112 08:12 | 136 08:11 | 149 08:37 |
| 30% | 503 09:25 | 662 09:18 | 119 09:06 | 486 09:52 | 473 09:43 | 902 09:30 | 637 09:22 | 882 09:40 | 104 09:52 | O |
| 20% | 032 10:10 | 506 10:03 | 507 10:17 | 219 10:47 | 872 10:26 | 093 10:53 | 262 10:57 | 948 10:40 | 499 10:39 | 844 10:26 |
| 10% | 629 11:19 | 334 11:17 | 516 11:52 | 438 11:57 | 726 11:23 | 132 11:43 | 295 11:12 | 325 11:32 | 106 11:06 | 009 11:40 |

Fig. 3A

| Global Table of Undo Hints 300 | | | | | | | | | |
|---|---|---|---|---|---|---|---|---|---|
| 328 05:27 | 002 05:53 | 010 06:01 | 101 06:02 | 938 6:03 | 266 6:03 | 711 6:12 | 212 6:14 | 772 06:17 | 617 6:19 |

Fig. 5

UNDO HINTS TO SPEED UP SEGMENT EXTENSION AND TUNING OF UNDO RETENTION

RELATED APPLICATIONS

This application is related to co-pending U.S. application Ser. No. 10/846,099, filed on May 13, 2004, entitled "Automatic Tuning of Undo Retention," and co-pending U.S. application Ser. No. 11/249,150, filed on Oct. 11, 2005 entitled "Longest Query Duration for Auto Tuning Undo Retention", both of which are hereby incorporated by reference in their entireties.

FIELD

Embodiments of the invention relate to computer systems, and more particularly to data recovery.

BACKGROUND OF THE INVENTION

In database systems, a "transaction" refers to an atomic set of operations performed against a database, which may access, create, modify or delete database data or metadata. A "commit" occurs when the transaction has completed its processing and any changes to the database by the transaction are ready to be permanently implemented in the database system.

Transaction log records can be maintained in a database system to allow data recovery in the event of an error, that may include hardware failure, network failure, process failure, database instance failure, data access conflicts, user errors, and statement failures in database access programs.

Various types of transaction log records can be maintained in a database system for data recovery. One type of log record that may be maintained is the "undo" record. Undo records contain information about changes that were introduced into the database system. For example, if a row in a table were modified, the changes will be stored in the undo record identifying the block of the database system that includes the modified table row.

Memory or disk space needs to be allocated for storage of undo records. Database managers may set the undo tablespace size by predicting how many undo records may be generated. Often there is not enough statistical information available for database administrators to use in order to arrive at an accurate prediction of undo records generation. Incorrect undo tablespace size may cause errors in the system, as not enough undo records may be available. Alternatively, allocating too much memory or disk space for storing undo records is inefficient.

Moreover, database administrators need to predict how long undo records should be maintained, a parameter known as the "undo retention." Users may require older versions of the data for various reasons. In order to prevent these users from obtaining error messages, undo records should be maintained in the system to allow the data to be retained to their previous values. However, undo tablespace is limited, and new transactions require undo tablespace. A user may therefore monitor the system activity and adjust the undo retention based on the amount of undo information generated by new transactions.

Undo records that are generated by active transactions may be known as active undo records. Undo records generated by relatively recent transactions, which committed more recently than the undo retention, may be referred to as "unexpired undo records." Undo records that were generated by relatively older transactions, which committed more distantly than the undo retention, may be referred to as "expired undo records."

When the allocated undo tablespace is too small or the system activity exceeds predicted levels, the system may encounter a condition known as "space pressure." Under space pressure, the undo tablespace may be severely limited. Because a transaction cannot succeed without storing undo records, transactions may be in danger of failing for lack of undo tablespace. Under such conditions, many database systems choose to eliminate existing undo records of non-active transactions and thus risk failing a query, rather than failing the transaction. Such database systems usually do not eliminate active undo records, and usually may choose to eliminate any expired undo records first. However, if no expired undo records can be found, these systems may choose to eliminate unexpired undo records. Such systems may eliminate unexpired undo records indiscriminately, eliminating newer undo records while older undo records remain in the system. This indiscriminate method of eliminating undo records may result in an unacceptable number of failed queries and other operations.

What is needed, therefore, is a solution that overcomes these and other shortcomings of the prior art.

SUMMARY OF THE INVENTION

Methods and systems for using undo hints to speed up segment extension are disclosed. While a process is searching other segments to find available space, the process collects undo hints that describe when space in a segment might become available. These undo hints are placed in a table of undo hints. When a process is not able to find available space, it may consult the table of undo hints to determine how much to decrease the undo retention. After the undo retention is decreased, the process may again consult the table of undo hints to find a segment that likely contains available space now that the undo retention time has been reduced.

In one implementation, the invention may include a method for using undo hints to speed up segment extension in a database. The method may include retrieving an undo hint from a table of undo hints, the undo hint specifying an undo segment, accessing the specified segment based on the retrieved undo hint, and allocating an expired extent from the specified segment to a full segment.

In another implementation, the invention may include a method for adjusting the undo retention in a database system. The method may include accessing a table of undo hints comprising a plurality of buckets, determining whether a first bucket in the plurality of buckets will provide an appropriate number of undo hints, and if the first bucket will provide an appropriate number of undo hints, adjusting the undo retention of the system based on the first bucket.

BRIEF DESCRIPTION OF THE DRAWINGS

The invention is illustrated by way of example and not limitation in the figures of the accompanying drawings, in which like references indicate similar elements and in which.

DETAILED DESCRIPTION

Methods and apparatuses for data recovery are described. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those skilled in the art. Thus, the invention can include any variety of combinations and/or integrations of the embodiments described herein.

Overview

In some database systems, undo tablespace may be divided into a plurality of undo segments. Often, each process in a database system is associated with a unique segment that is used to store undo records for that process. Segments may be further divided into extents, each of which may comprise some number of contiguous undo blocks. Each extent may have a particular commit time associated with the extent, and therefore, each extent may be considered to be expired or unexpired as a whole, with respect to undo retention. If a process needs to write a new undo record but cannot find an expired extent in its own segment, it may access the undo tablespace to request free tablespace to be added to its segment as a new extent. If there is no free tablespace, the process may traverse other segments, searching for an expired extent. If the process finds an expired extent, it absorbs that extent into its own segment. If no expired extent can be found, the process may absorb an unexpired extent into its own segment.

Adding a new extent to an additional segment, whether the new extent comes from a portion of unused tablespace, from an expired extent in another segment, or from an unexpired extent in another segment, may be referred to as "segment extension."

Figure 1:
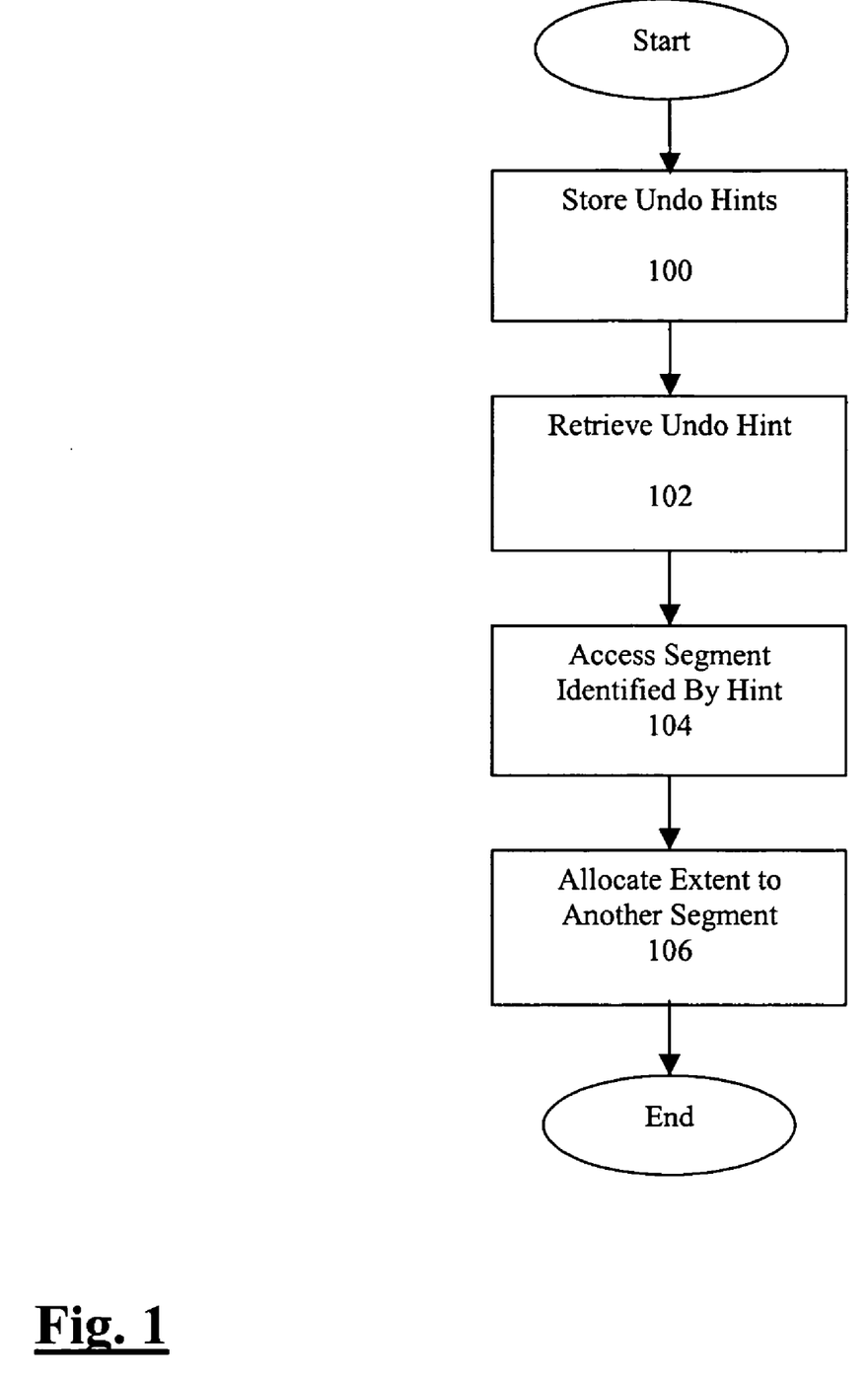
FIG. 1 is a flow chart illustrating a method for using undo hints to speed up segment extension, in accordance with an embodiment of the present invention.
Figure 3A:
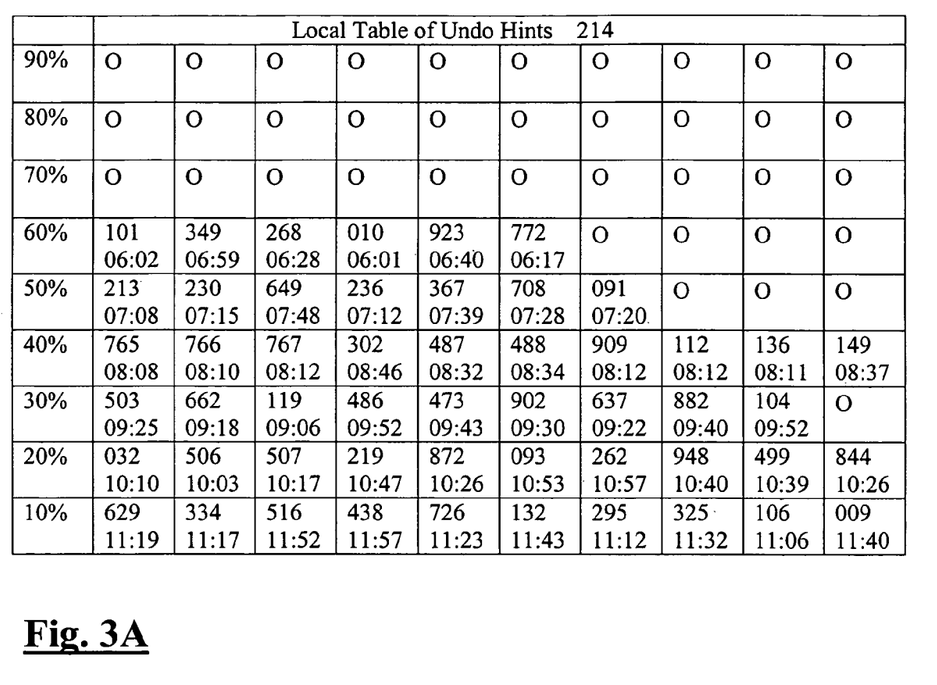
FIGS. 3A-B are block diagrams illustrating tables of undo hints, in accordance with an embodiment of the present invention.
Figure 3B:
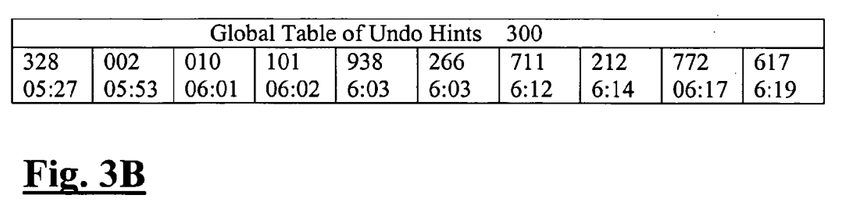

FIG. 1 is a flow chart illustrating a method for using undo hints to speed up segment extension. As shown in FIG. 1, the method may begin in step 100, wherein undo hints may be stored. The undo hints may be stored, for example, in a local table as illustrated in FIG. 3A, and/or in a global table as illustrated in FIG. 3B. The undo hints stored may contain references to segments where expired extents are likely to be found for particular undo retentions. Storing undo hints will be discussed further with reference to FIG. 4.

The method may continue in step 102, wherein an undo hint may be retrieved. Retrieving undo hints will be discussed further with reference to FIG. 4. In step 104, a segment identified by the hint may be accessed. If the segment contains an expired extent for the current undo retention time, the expired extent may be allocated to another segment 106.

In some cases, the hint may not identify a segment with an expired extent. This occurs, for example, when another process has already used the hint and absorbed the expired extent. In this case, the method may return to step 102, wherein another hint may be retrieved. The segment identified by the second hint will be then be examined to determine whether it contains an expired extent. The method may repeat until an expired extent is found.

Embodiments of the present invention also include methods for selectively reducing the undo retention time. The local table may be examined to determine whether any hints exist for a particular undo retention time. The undo retention time may then be selectively reduced to a point where hints exist. Methods for reducing the undo retention time will be discussed further with reference to FIG. 4.

Systems Used in Segment Extension

Figure 2:
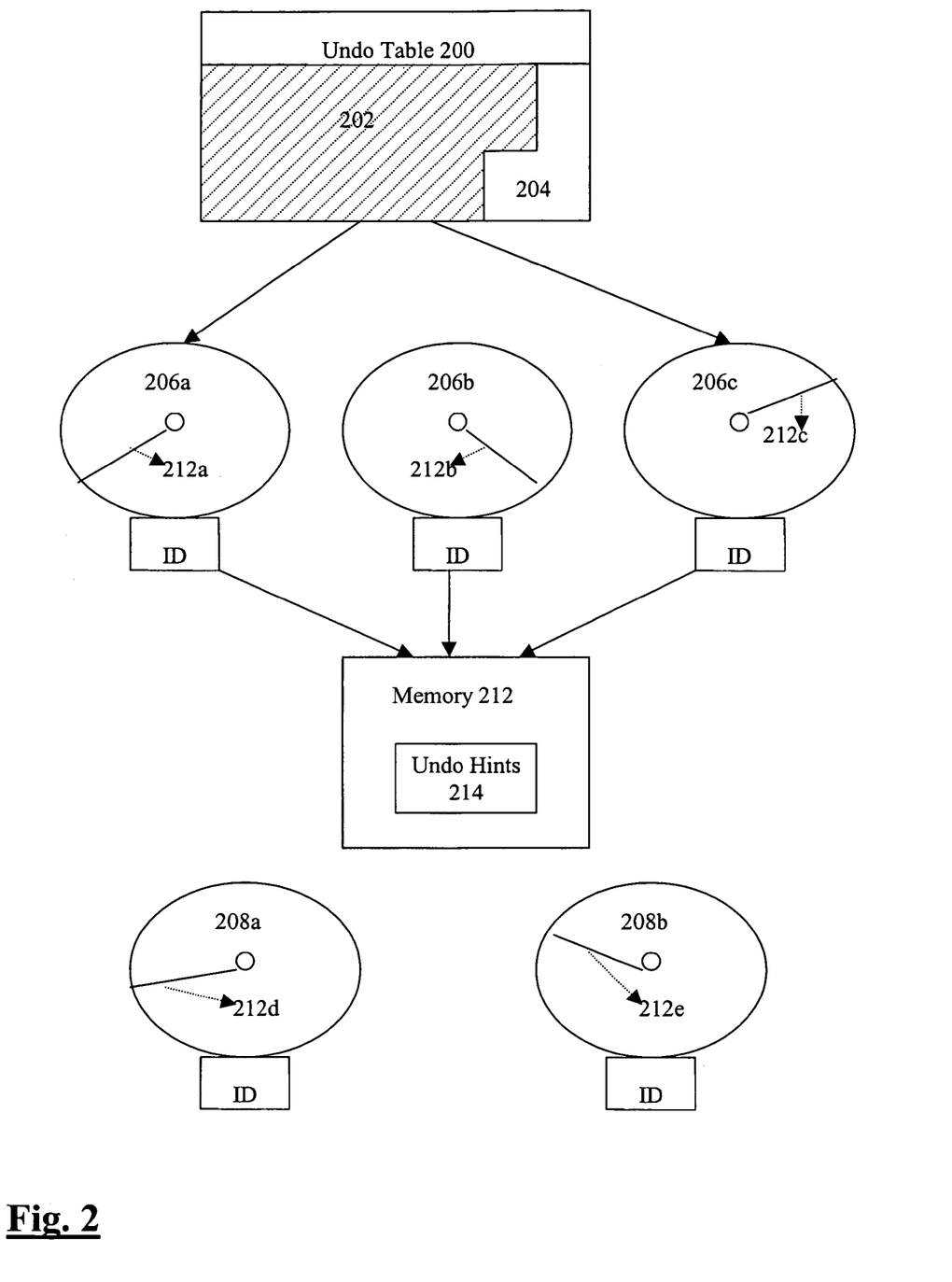
FIG. 2 is a block diagram illustrating a database system architecture, in accordance with an embodiment of the present invention.

FIG. 2 is a block diagram illustrating a database system, in accordance with an embodiment of the present invention. As shown in FIG. 2, an undo table 200 include used tablespace 202 and free tablespace 204. The undo tablespace 200 may be divided into a plurality of segments 206a-c and 208a-b. The segments 206a-c and 208a-b may together comprise the used tablespace 202 of the undo table 200. The segments 206a-c and 208a-b may not be separate disk spaces, but may rather be segments that have been logically carved out of the undo table 200. Furthermore, the segments 206a-c and 208a-b need not be contiguous spans from the undo table 200, but may rather include a plurality of extents that have been logically configured to represent a discrete space. The segments 206a-c and 208a-b may further be logically configured to simulate circular buffers.

Each segment 206a-c and 208a-b may further include a high-water mark 212a-e that identifies the oldest extent in the segment. This may allow processes to determine if the segment contains any expired extents simply by identifying a single extent in the segment. In addition, each segment 206a-c and 208a-b may include an identification number that may be used to uniquely identify the segment.

The system may further include memory 210. The segments 206a-c and 208a-b may comprises online segments 206a-c and offline segments 208a-b. The online segments 206a-c store information relating to active transactions, while the offline segments 208a-b store information relating to committed transactions. Information regarding the online segments 206a-c may be stored in memory 210, while no information regarding the offline segments 208a-b may be stored in memory 210.

Periodic processes in the system may search for expired extents in each segment and return the expired extents to the free tablespace 204. By the time segments 208a-b are taken offline, most of their space will likely have been returned to the free tablespace 204. Thus, the offline segments 208a-b typically contain relatively little space. Other precautions may also be taken to ensure that offline segments contain relatively little space.

In the case of space pressure, the free tablespace 204 in the undo tablespace may no longer exist. In this case, processes may not be able to find expired extents in their own segment. Rather, the processes will examine other segments searching for extents to add to their own segment. In examining other segments, the processes may use a local table of undo hints 214, which may be stored in memory 210, and/or a global table of undo hints, which may be stored, for example, in shared memory.

FIG. 3A is a block diagram illustrating a local table of undo hints 214. As shown in FIG. 3A, the local table of undo hints 214 may be a two-dimensional table divided into a plurality of rows. Each row may correspond to a particular undo retention. In the example shown in FIG. 3A, there are nine rows, beginning at 90% and decrementing at regular intervals to 10%. The first row corresponds to 90% of the current undo retention, the second row corresponds to 80% of the current undo retention, and so on.

Each of the rows in the table may be referred to as a "bucket." For example, the first row may be referred to as the 90% bucket, the second row may be referred to as the 80% bucket, and so on. Each of the buckets stores some number of undo hints. The undo hints stored in a particular bucket identify a segment that would likely include an expired extent if the undo retention were reduced as specified by the bucket. For example, the 90% bucket identifies segments that would likely include an expired extent if the undo retention were decreased to 90% of its current value, the 80% bucket identifies segments that would likely include an expired extent if the undo retention were decreased to 80% of its current value, and so on.

While the example shown in FIG. 3A illustrates 9 buckets, each describing a percentage value, other implementations will occur to those skilled in the art. For example, any number of buckets could be used, or the number of buckets could be manually or electronically adjusted based on the system activity. Furthermore, while the buckets have been described in terms of percentage values, the buckets could be described in terms of time periods, such as 9 hours, 8 hours, and the like. In addition, while the buckets have been shown as decreasing at regular intervals, other intervals are possible. Many other implementations will occur to those skilled in the art.

Each of the buckets is configured to contain some number of hints. In the example shown, the local table 214 has 10 columns, and each bucket is therefore configured to contain 10 hints. However, any other number of hints can be used, or the number of buckets could be manually or electronically adjusted based on the system activity.

For some of the buckets, there may not be enough hints to fill the bucket. In this case, some portions of the bucket will be empty. In the current example, this is the case for the 60%, 50%, and 30% buckets. Furthermore, for some buckets, there may not be any hints for the bucket. In the current example, this is the case for the 90%, 80%, and 70% buckets. This indicates that, if the undo retention were decreased to 90%, 80%, or 70% of its current value, there still would not be any expired extents.

Each hint that is stored in the local table contains information describing a segment. This may be or include, for example, the unique identification number for the segment. Furthermore, each hint that is stored in the local table may contain an extent commit time. This may be, for example, the commit time of the oldest extent in the segment. In some implementations, the oldest extent in the segment may be located at the high-water mark for the segment. Storing an extent commit time may allow undo hints to be used in systems with auto tuning of undo retention, discussed below with reference to FIG. 3B.

FIG. 3B is a block diagram illustrating a global table of undo hints. As shown in FIG. 3B, each hint may contain information describing a segment. This may be or include, for example, the unique identification number for the segment. Furthermore, each hint may contain an extent commit time. This may be, for example, the commit time of the oldest extent in the segment, which may be located at the high-water mark for the segment. The hints in the global table may be ordered, for example, based on the extent commit time.

When a process uses a hint from the local table shown in FIG. 3A, it may obtain all the other hints from the same bucket. The process may then place the other hints from the bucket into the global table of undo hints shown in FIG. 3B if it is determined that those hints expire sooner than the hints currently in the table.

An hint may be considered "valid" if the extent with the commit time contained in the hint has expired. Even if a hint is valid, it is not guaranteed that space will be available, because another process may have already used the hint.

When a process uses a hint from the local table shown in FIG. 3A, it also reduces the undo retention time to ensure that the hint is valid. In this case, all the other hints in the bucket will be valid as well. Thus, at the time hints are placed into the global table of FIG. 3B, the hints will be valid.

However, in systems with auto tuning of undo retention, the undo retention may be automatically adjusted based on the system activity. Such tuning may be known as "active tuning," and may occur independently of the tables of undo hints to attempt to prevent the system from encountering space pressures. If the system does encounter space pressure, "reactive tuning" may be performed to adjust the undo retention time. Reactive tuning may include consulting the tables of undo hints to determine an appropriate amount to decrease the undo retention.

Because some time passes between the time an undo hint is stored and the time it is used, it is possible that the active tuning process may have adjusted the retention time. Thus, a hint that is valid when it is placed into the global table of FIG. 3B may no longer be valid at a later time, for example, if the retention time has been increased. Storing the extent commit time for each hint in the global table of FIG. 3B allows processes to check that a hint is valid before attempting to obtain space based on the hint.

Method for Using Undo Hints to Speed Up Segment Extension

Figure 4:
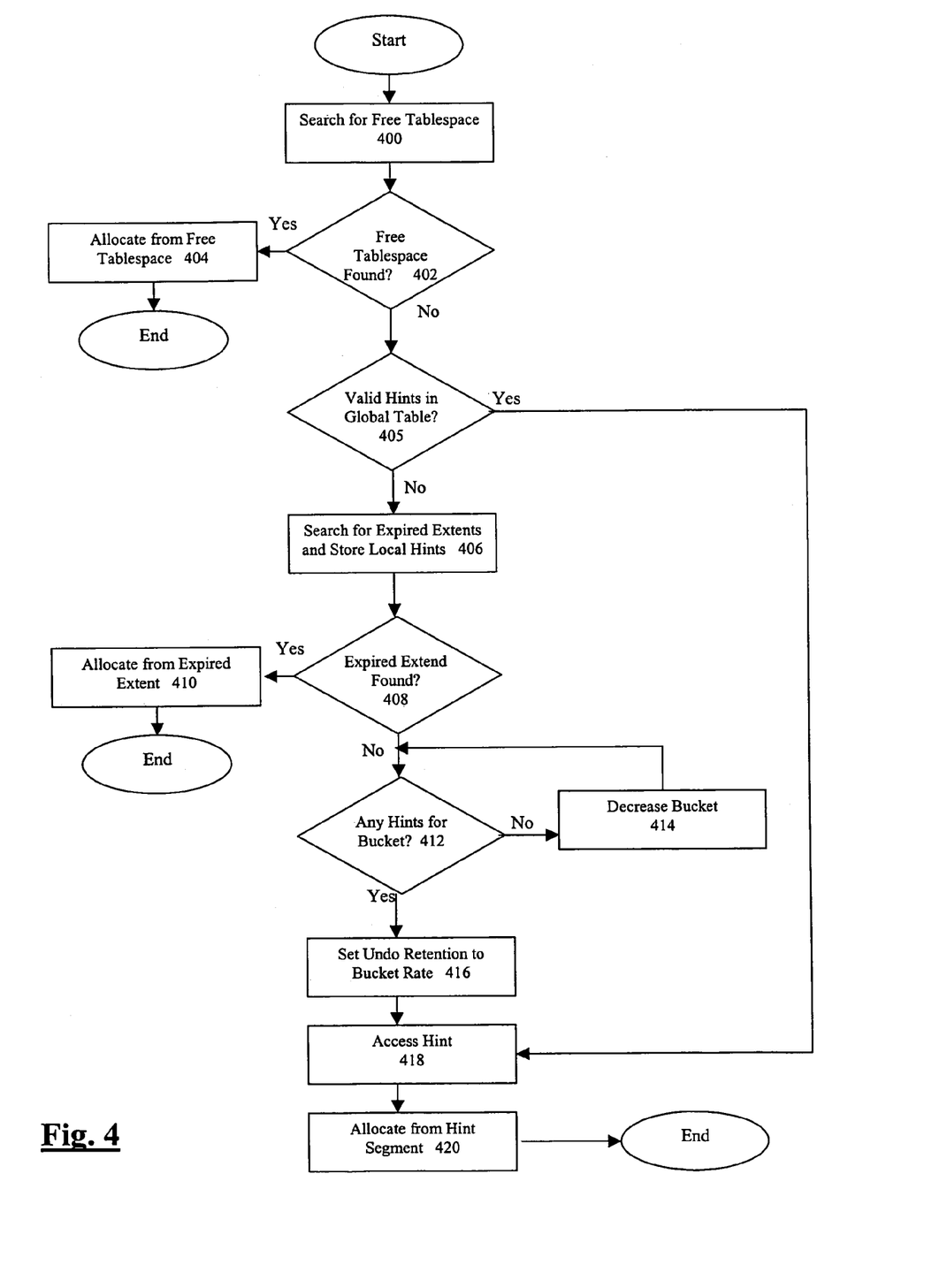
FIG. 4 is a flow chart illustrating a method for using undo hints to speed up segment extension, in accordance with an embodiment of the present invention.

FIG. 4 is a flow chart illustrating a method for using undo hints to speed up segment extension. When a process requires more space than is found in its own segment, the method may begin in step 400, wherein the process may search for free tablespace. If free tablespace is found 402, free tablespace may be allocated to the process in step 404. Allocating free tablespace to the process may include, for example, extending the segment corresponding to the process by allocating free tablespace to the segment.

If no free tablespace is found 402, the method may continue in step 405, wherein it may be determined if any valid hints exist in the global table. This may include, for example, accessing the hint with the earliest commit time and determining whether the hint is valid. If a valid hint is found in the global table, the method may continue in step 418.

If there are no valid hints in the global table, the process may search for expired extents and store local hints 406. In order to search for expired extents, the process may traverse other segments and determine the commit time of the oldest extent in the segment. While the process is traversing other segments, the process may find segments that could be used as hints. If the process finds such segments, information regarding the segments is stored in the local table of undo hints. Because local hints are stored while searching for expired extents, each segment may be traversed only once. Thus, the overhead in the system may be reduced, as the hints are gathered during the process of searching for expired extents.

If, during the search for expired extents in step 406, an expired extent is found 408, the expired extent may be allocated in step 410. Allocating the expired extent may include, for example, extending the segment corresponding to the process by allocating the expired extent to that segment.

If no expired extents are found, the local table of undo hints may then be consulted. If no expired extents were found, the process has traversed each segment in the system in its search for expiring extents. Because each segment has been traversed, each bucket will contain as many hints as possible. Some buckets may be full, having the maximum number of undo hints. Some buckets may be partially full, because there are not enough expiring segments for that particular bucket. Some buckets may be empty, because there are not any expiring segments for that bucket.

In the case where there are more expiring segments than spaces in the bucket, various algorithms may be used to determine which segment should be placed in the local table as a local hint. In one implementation, the segments are placed in the local table in a first come, first served order. This may reduce the processing time for creating the table. In other implementations, the oldest segments may be placed in the table, or the segments containing the largest expiring extents may be placed in the table. Other implementations will occur to those skilled in the art.

If local hints are placed into the local table in a first come, first served order, the local hints entered into the local table may not necessarily identify the extents that will expire the soonest.

Steps 412 and 414 iterate through the buckets in decreasing order to find a bucket that will provide any hints. In step 412, it may be determined whether a bucket contains any hints.

For example, referring to the local table of FIG. 3A, it may be determined in step 412 that there are no hints in the 90% bucket. The bucket will be decremented to 80% in step 414 and the method will return to step 412. In step 412, it may then be determined that the 80% bucket contains no hints. Steps 412 and 414 may be repeated until the 60% bucket is reached. In this case, it may be determined in step 414 that the 60% bucket contains hints, and the method may continue in step 416.

In another implementation, the method may iterate through the buckets in order to find a bucket with an appropriate number of hints. This may include, for example, comparing the number of hints in the bucket to a fixed number, or keeping a running total of hints thus far and comparing the total to a fixed number.

Once a bucket with an appropriate number of hints has been found, in step 416, the undo retention may be set as specified by the bucket. This may include, for example, decreasing the undo retention to the undo retention specified by the bucket. Continuing the earlier example, the undo retention would be set to 60% of its current value.

In step 418, a hint is accessed. The hint may be a global hint accessed from a global table, or a local hint accessed from a local table. If the hint is accessed from the local table, it may be accessed, for example, from the bucket identified in steps 412-414. The hint may include, for example, an identifier identifying a segment, and an extent commit time describing the commit time of the oldest extent in the segment. If the hint is a global hint, the extent commit time may be examined to see if the hint is valid. This may include, for example, adding the current undo retention time to the extent commit time, and comparing the sum to the current system time.

In step 420, space may be allocated from the hint segment. Allocating space from the hint segment may include, for example, allocating an expired extent in the hint segment to the segment used by the process. If another process has already used the hint, the method may return to step 418 and another hint from the table may be accessed. If the process has accessed all the hints from the current bucket and found that another process has used each hint, the method may return to step 414, and the bucket may be decreased.

System Architecture Overview

Figure 5:
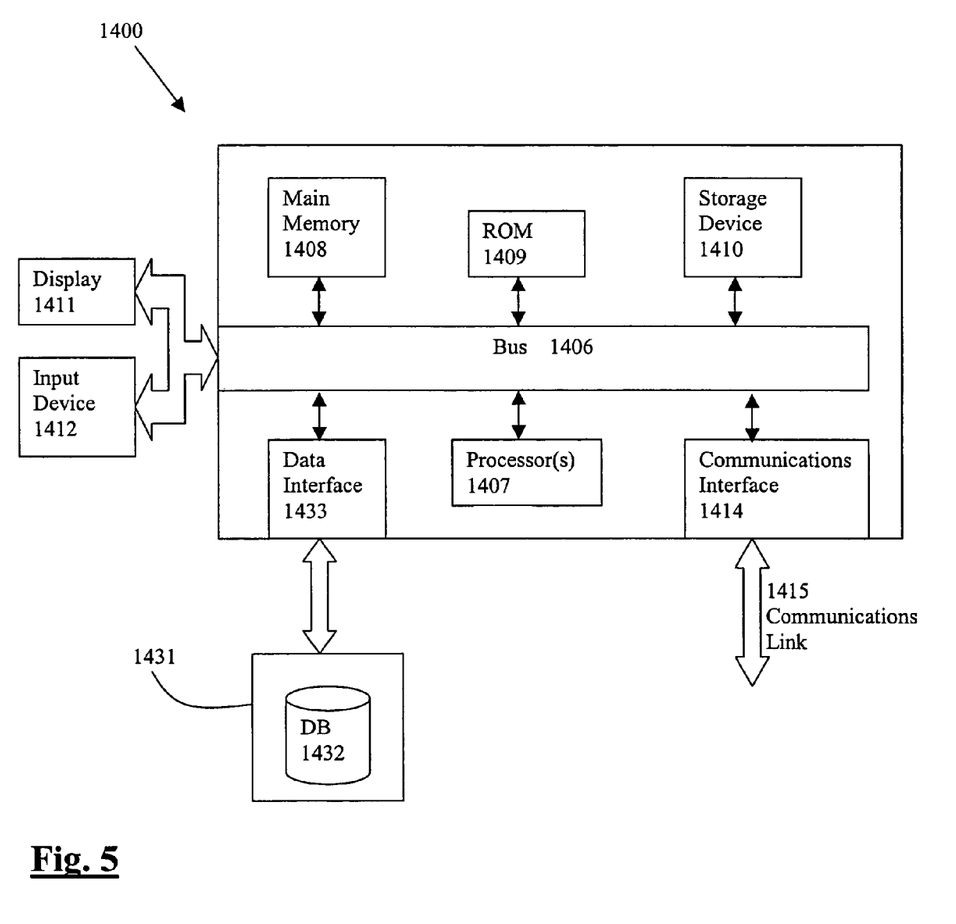
FIG. 5 illustrates a processing system in which embodiments of the invention may be practiced.

The execution of the sequences of instructions required to practice the invention may be performed in embodiments of the invention by a computer system 1400 as shown in FIG. 5.

In an embodiment of the invention, execution of the sequences of instructions required to practice the invention is performed by a single computer system 1400. According to other embodiments of the invention, two or more computer systems 1400 coupled by a communication link 1415 may perform the sequence of instructions required to practice the invention in coordination with one another. In order to avoid needlessly obscuring the invention, a description of only one computer system 1400 will be presented below; however, it should be understood that any number of computer systems 1400 may be employed to practice the invention.

A computer system 1400 according to an embodiment of the invention will now be described with reference to FIG. 5, which is a block diagram of the functional components of a computer system 1400 according to an embodiment of the invention. As used herein, the term computer system 1400 is broadly used to describe any computing device that can store and independently run one or more programs.

Each computer system 1400 may include a communication interface 1414 coupled to the bus 1406. The communication interface 1414 provides two-way communication between computer systems 1400. The communication interface 1414 of a respective computer system 1400 transmits and receives electrical, electromagnetic or optical signals, that include data streams representing various types of signal information, e.g., instructions, messages and data. A communication link 1415 links one computer system 1400 with another computer system 1400. For example, the communication link 1415 may be a LAN, in which case the communication interface 1414 may be a LAN card, or the communication link 1415 may be a PSTN, in which case the communication interface 1414 may be an integrated services digital network (ISDN) card or a modem.

A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals, that include data streams representing various types of signal information, e.g., instructions, messages and data. In embodiments of the invention, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407.

The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407.

A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment of the invention, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 1407. Such a medium may take many forms, including, but not limited to, non-volatile, volatile and transmission media. Non-volatile media, i.e., media that can retain information in the absence of power, includes the ROM 1409, CD ROM, magnetic tape, and magnetic discs. Volatile media, i.e., media that cannot retain information in the absence of power, includes the main memory 1408. Transmission media includes coaxial cables, copper wire and fiber optics, including the wires that comprise the bus 1406. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

What is claimed is:

1. A computer implemented method for using undo hints to speed up segment extension in a database, comprising:
   determining whether there is any available space for segment extension based at least in part upon a current undo retention;
   when there is not any said available space for segment extension, accessing an undo hint from a set of undo hints;
   decreasing, by using a processor, the current undo retention based at least in part upon the undo hint, wherein the undo hint contains an identifier to a space of an undo record that has not expired but where the undo record would be an expired undo record if the current undo retention were to be reduced to a particular undo retention, wherein the particular undo retention is the current undo retention reduced by a value;
   allocating the space of the expired undo record to a segment; and
   storing information associated with the space in a volatile or non-volatile computer-usable medium or displaying the information on a display device.

2. The method of claim 1, further comprising:
   storing hints in a table of undo hints.

3. The method of claim 2, wherein hints are stored in the table of undo hints based at least in part upon a search for expired extents.

4. The method of claim 1, further comprising:
   selecting a bucket from a plurality of buckets in an undo hint table.

5. The method of claim 4, wherein the undo hint is retrieved from the selected bucket.

6. The method of claim 4, wherein the undo retention is reduced based at least in part upon the selected bucket.

7. The method of claim 1, wherein the undo hint further comprises information describing an extent commit time.

8. The method of claim 7, further comprising:
   determining whether the hint is valid based at least in part upon the extent commit time.

9. The method of claim 1, wherein the hint is a local hint.

10. The method of claim 1, wherein the hint is a global hint.

11. A computer-implemented method for adjusting the undo retention in a database system, comprising:
    accessing, by using a processor, a table of undo hints for segment extension Comprising a plurality of buckets, wherein undo hints are stored in at least one of the plurality of buckets, wherein the undo hint contains an identifier to a space for an undo record that has not expired but where the undo record would be an expired undo record if a current undo retention were to be reduced to a particular undo retention, wherein the particular undo retention is a current undo retention reduced by a value;
    determining whether a first bucket in the plurality of buckets will provide any undo hints;
    adjusting the undo retention of the database system based at least in part upon the act of determining; and
    storing the adjusted undo retention of the system in a volatile or non-volatile computer-usable medium or displaying the adjusted undo retention of the system on a display device.

12. The method of claim 11, wherein the first bucket specifies a first undo retention.

13. The method of claim 12, further comprising:
    if the first bucket will not provide any undo hints, adjusting the undo retention of the system based at least in part upon a second bucket.

14. The method of claim 13, wherein the first bucket specifies a first undo retention, and the second bucket specifies a second undo retention lower than the first undo retention.

15. The method of claim 11, wherein adjusting the undo retention:
    decreasing the undo retention of the system to a percentage of its current value as specified by the bucket.

16. The method of claim 11, wherein adjusting the undo retention comprises:
    decreasing the undo retention of the system to a fixed value as specified by the bucket.

17. A computer program product comprising a volatile or non-volatile computer usable medium having executable code to execute a process by a processor for using undo hints to speed up segment extension, the process comprising:
- determining whether there is any available space for segment extension based at least in part upon a current undo retention;
- when there is not any said available space for segment extension, accessing an undo hint from a set of undo hints;
- decreasing, by using a processor, the current undo retention based at least in part upon the undo hint, wherein the undo hint contains an identifier to a space for an undo record that has not expired but where the undo record would be an expired undo record if the current undo retention were to be reduced to the a particular undo retention, wherein the particular undo retention is the current undo retention reduced by a value;
- allocating the space of the expired undo record to a segment; and
- storing information associated with the space or displaying the information on a display device.

18. A system for using undo hints to speed up segment extension, comprising:
- a processor programmed for:
  - determining whether there is any available space for segment extension based at least in part upon a current undo retention;
  - when there is not any said available space for segment extension, accessing an undo hint from a table of undo hints;
  - decreasing, by using a processor, the current undo retention based at least in part upon the undo hint, wherein the undo hint contains an identifier to a space of an undo record that has not expired but where the undo record would be an expired undo record if the current undo retention were to be reduced to the a particular undo retention, wherein the particular undo retention is the current undo retention reduced by a value;
  - allocating the space of the expired undo record to a segment; and
- a volatile or non-volatile computer readable medium for storing information associated with the space or a display device for displaying information associated with the space.

19. The product of claim 17, wherein the process further comprises:
- selecting a bucket from a plurality of buckets in the undo hint table; and
- adjusting the undo retention based on the selected bucket, wherein the selected bucket is associated with an undo retention.

20. The system of claim 18, wherein the processor is further programmed for:
- selecting a bucket from a plurality of buckets in the undo hint table; and
- adjusting an undo retention of the system based at least in part upon the selected bucket, wherein the selected bucket is associated with the undo retention.

21. A computer program product comprising a volatile or non-volatile computer usable medium having executable code to execute a process by a processor for adjusting the undo retention in a database system, the process comprising:
- accessing, by using a processor, a table of undo hints for segment extension comprising a plurality of buckets, wherein undo hints are stored in at least one of the plurality of buckets, wherein the undo hint contains an identifier to a space for an undo record that has not expired but where the undo record would be an expired undo record if a current undo retention were to be reduced to a particular undo retention, wherein the particular undo retention is a current undo retention reduced by a value;
- determining whether a first bucket in the plurality of buckets will provide any undo hints;
- adjusting the undo retention of the system based at least in part upon the act of determining; and
- storing the adjusted undo retention of the system or displaying the adjusted undo retention of the system on a display device.

22. The product of claim 21, wherein the first bucket specifies a first undo retention, wherein the process further comprising:
- if the first bucket will not provide any undo hints, adjusting the undo retention of the system based at least in part upon a second bucket, wherein the first bucket specifies a first undo retention, and the second bucket specifies a second undo retention lower than the first undo retention.

23. The product of claim 21, wherein adjusting the undo retention comprising:
- decreasing the undo retention of the system to a percentage of its current value as specified by the bucket or to a fixed value as specified by the bucket.

24. A system for adjusting the undo retention in a database system, comprising:
- a processor programmed for:
  - accessing a table of undo hints for segment extension comprising a plurality of buckets, wherein undo hints are stored in at least one of the plurality of buckets, wherein the undo hint contains an identifier to a space for an undo record that has not expired but where the undo record would be an expired undo record if a current undo retention were to be reduced to a particular undo retention, wherein the particular undo retention is a current undo retention reduced by a value;
  - determining whether a first bucket in the plurality of buckets will provide any undo hints;
  - adjusting the undo retention of the system based at least in part upon the act of determining; and
- a volatile or non-volatile computer-usable medium for storing the adjusted undo retention of the system or a display device for displaying the adjusted undo retention of the system.

25. The system of claim 24, wherein the first bucket specifies a first undo retention, further comprising:
- if the first bucket will not provide any undo hints, adjusting the undo retention of the system based at least in part upon a second bucket, wherein the first bucket specifies a first undo retention, and the second bucket specifies a second undo retention lower than the first undo retention 26. The system of claim 24, wherein adjusting the undo retention comprising:
- decreasing the undo retention of the system to a percentage of its current value as specified by the bucket or to a fixed value as specified by the bucket.

* * * * *

UNITED STATES PATENT AND TRADEMARK OFFICE
CERTIFICATE OF CORRECTION

PATENT NO.        : 7,801,932 B2                                    Page 1 of 1
APPLICATION NO.   : 11/249149
DATED             : September 21, 2010
INVENTOR(S)       : Vasudha Krishnaswamy It is certified that error appears in the above-identified patent and that said Letters Patent is hereby corrected as shown below:

In column 10, line 32, in claim 11, delete "Comprising" and insert -- comprising --, therefor.

In column 10, line 59, in claim 15, delete ":" and insert -- comprises: --, therefor.

In column 11, line 14, in claim 17, after "reduced to" delete "the".

In column 12, line 57, in claim 25, after "retention" insert -- . --.

Signed and Sealed this
Sixteenth Day of August, 2011

David J. Kappos
*Director of the United States Patent and Trademark Office*